(12) United States Patent
Gasparik

(10) Patent No.: US 7,093,041 B2
(45) Date of Patent: Aug. 15, 2006

(54) DUAL PURPOSE PCI-X DDR CONFIGURABLE TERMINATOR/DRIVER

(75) Inventor: Frank Gasparik, Monument, CO (US)

(73) Assignee: LSI Logic Corporation, Milpitas, CA (US)

( * ) Notice: Subject to any disclaimer, the term of this patent is extended or adjusted under 35 U.S.C. 154(b) by 373 days.

(21) Appl. No.: 10/027,720

(22) Filed: Dec. 20, 2001

(65) Prior Publication Data

US 2003/0120847 A1 Jun. 26, 2003

(51) Int. Cl.
G06F 13/00 (2006.01)

(52) U.S. Cl. .................. 710/100; 710/316; 710/317; 710/107; 326/30; 327/108

(58) Field of Classification Search .............. 710/100, 710/305, 316–317; 326/81, 30; 327/112, 327/108
See application file for complete search history.

(56) References Cited

U.S. PATENT DOCUMENTS

| 5,218,239 | A |   | 6/1993 | Boomer |         |
|-----------|---|---|--------|--------|---------|
| 5,220,208 | A |   | 6/1993 | Schenck |        |
| 5,568,081 | A |   | 10/1996 | Lui |            |
| 6,130,556 | A | * | 10/2000 | Schmitt et al. | 326/81 |
| 6,133,773 | A | * | 10/2000 | Garlepp et al. | 327/247 |
| 6,304,066 | B1 | * | 10/2001 | Wilcox et al. | 323/282 |
| 6,323,756 | B1 |   | 11/2001 | Yoshikawa et al. | |
| 6,357,013 | B1 | * | 3/2002 | Kelly et al. | 713/324 |
| 6,362,678 | B1 | * | 3/2002 | Bosnyak et al. | 327/374 |
| 6,445,245 | B1 | * | 9/2002 | Schultz et al. | 327/541 |
| 6,483,354 | B1 | * | 11/2002 | Gasparik | 327/112 |
| 6,559,675 | B1 | * | 5/2003 | Koo | 326/81 |
| 2002/0057106 | A1 | * | 5/2002 | Koo | 326/80 |
| 2002/0136343 | A1 | * | 9/2002 | Cranford et al. | 375/376 |

OTHER PUBLICATIONS

Implementation of PCI bus virtual driver, Doug Hahn, Mitsubishi Electri ITCA.*

* cited by examiner

Primary Examiner—Rehana Perveen
Assistant Examiner—Kim T. Huynh
(74) Attorney, Agent, or Firm—Suiter-West-Swantz PC LLO

(57) ABSTRACT

A dual purpose PCI-X DDR configurable terminator/driver providing programmable termination of the interface in a PCI-X system a plurality of N-channel devices divided into at least two groups and a plurality of P-channel devices also divided into at least two groups. A driver control individually controls selected ones of the groups of N-channel and P-channel devices on or off for providing internal termination to the transmission line. The configurable PCI-X DDR driver/terminator is configurable in three termination modes: pull-up mode, pull-down mode, and symmetric mode.

21 Claims, 2 Drawing Sheets

DUAL PURPOSE PCI-X DDR CONFIGURABLE TERMINATOR/DRIVER

FIELD OF THE INVENTION

The present invention generally relates to the field of Peripheral Component Interfaces (PCI) utilized in computer systems and the like, and particularly to a dual purpose PCI-X DDR configurable terminator/driver providing programmable termination of the interface.

BACKGROUND OF THE INVENTION

The Peripheral Component Interface (PCI) is used in personal computers as an interface between the central processing unit (CPU) and various peripheral components such as VGA controllers, and the like. The PCI-X 2.0 DDR provides PCI technology with Double Data Rate (DDR) transfers. The original PCI bus was an unterminated transmission media mostly used in the point-to-point connections. This methodology worked well as long as the board trace length was restricted and the clock/data rates were below 100 MHz (legacy PCI systems have data rates equal to 33 MHz and 66 MHz). The signal integrity deteriorates rapidly in data transmission systems utilizing the unterminated transmission lines. The mismatch between the transmission line characteristic impedance and the load impedance (in this case the load impedance is an open circuit) will cause the signal reflections and negatively affect the signal integrity.

Future generations of PCI, such as PCI-X DDR, will increase the data rates to frequencies (f) of 133 MHz and beyond. Shorter signal periods (T=1/f) will not allow sufficient time for the signal overshoot/undershoot and ringing to settle out. Even with short transmission lines (board traces) the reflections must be minimized and controlled by proper line termination. Use of external line termination is unacceptable for a number of reasons. First, external termination is costly, incurring additional component, assembly labor and board area costs. Further, signal integrity is degraded due to the added external devices and trace parasitics. Moreover, the terminator must be made switchable, i.e. must be turned off, when the direction of data transfer is reversed.

The addition of an on-chip terminator costs an unacceptable silicon area penalty. The PCI-X DDR transceivers are located on the silicon chip periphery, called pads. The PCI-X DDR driver consumes the largest portion of the pad due to large MOSFET output devices. The addition of another large MOSFET device for implementation of the discrete terminator will consume a large amount of additional pad silicon area and will increase the PCI pad parasitic capacitance which is harmful to the signal integrity.

FIG. 1 illustrates a typical PCI-X system 100. As shown in FIG. 1, data transfer is from the $PCI_1$ block 102 to the $PCI_2$ block 104. The driver $DX_1$ 106 is enabled to drive the transmission line $X_1$ 108 such as PC board trace. The transmission line $X_1$ 108 far-end terminal $X_{1out}$ 110 is connected to the input of the enabled receiver $RX_2$ 112. The receiver $RX_1$ 114 and the driver $DX_2$ 116 are disabled during this data transmission.

For high signal integrity, it is desirable to have the driver $DX_1$ 106 output impedance $Z_{out}$ equal to the transmission line characteristic impedance $Z_o$, i.e. $Z_{out}=Z_o$. Thus, it is desirable to have the input impedance $Z_{in}$ of the receiver $RX_2$ 112 also equal to the transmission line characteristic impedance $Z_o$, i.e. $Z_{IN}=Z_o$. In the embodiment shown in FIG. 1, the input impedance $Z_{IN}$ of receiver $RX_2$ 116 is many orders of magnitude higher than the characteristic impedance $Z_o$ of the transmission line, i.e. $Z_{IN}>>Z_o$. In existing PCI systems no termination is used at the far end of the transmission line. This results in impedance mismatch for the unterminated transmission line. Consequently, signal reflections will cause severe distortions to the signal and negatively affect the reliability of data transmission.

During the mode of transmission described, the far end driver $DX_2$ 116 is tri-stated, idle, while the receiver $RX_2$ 112 is receiving the incoming data stream. The present invention employs the unused driver $DX_2$ devices 116 for the purpose of implementation of proper far end transmission line termination.

SUMMARY OF THE INVENTION

Accordingly, the present invention is directed to a dual purpose PCI-X DDR configurable terminator/driver suitable for use in a PCI-X DDR system for providing programmable termination of the interface in a PCI-X system. In exemplary embodiments, the PCI-X DDR configurable terminator/driver includes a plurality of N-channel devices divided into at least two groups and a plurality of P-channel also divided into at least two groups. A driver control individually controls selected ones of the groups of N-channel and P-channel devices on or off for providing internal termination to the transmission line. The configurable PCI-X DDR driver/terminator is configurable in three termination modes: pull-up mode, pull-down mode, and symmetric mode.

The configurable PCI-X DDR driver/terminator may utilize existing driver devices without the additional chip area penalty, and may be programmable for correct terminator impedance value $R_T=Z_o$ and maintains the process/voltage/temperature characteristics of the termination impedance. Preferably, the configurable PCI-X DDR driver/terminator does not increase the parasitic capacitance of the pad by using the same devices of the driver. The driver/terminator may further have applications in other transmission methodologies such as AGP4X, AGP8X, and the like.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
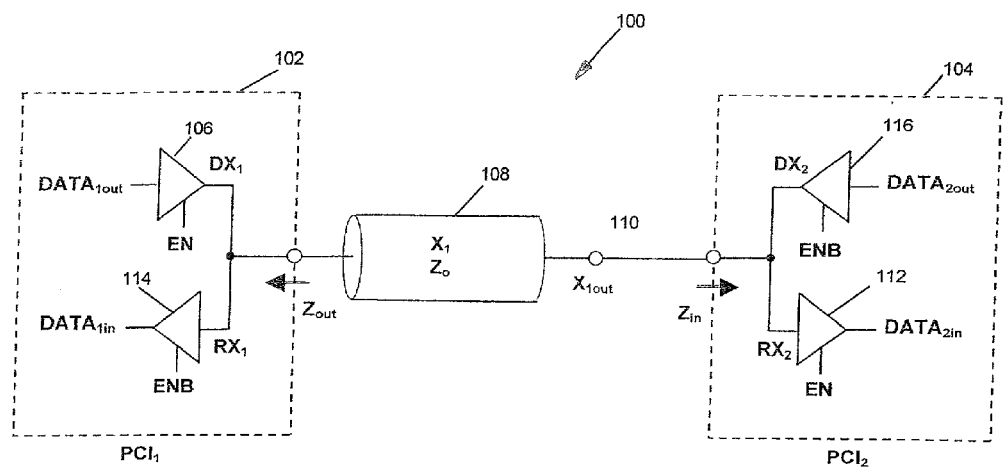
FIG. 1 is a block diagram illustrating an exemplary PCI-X system.
Figure 2:
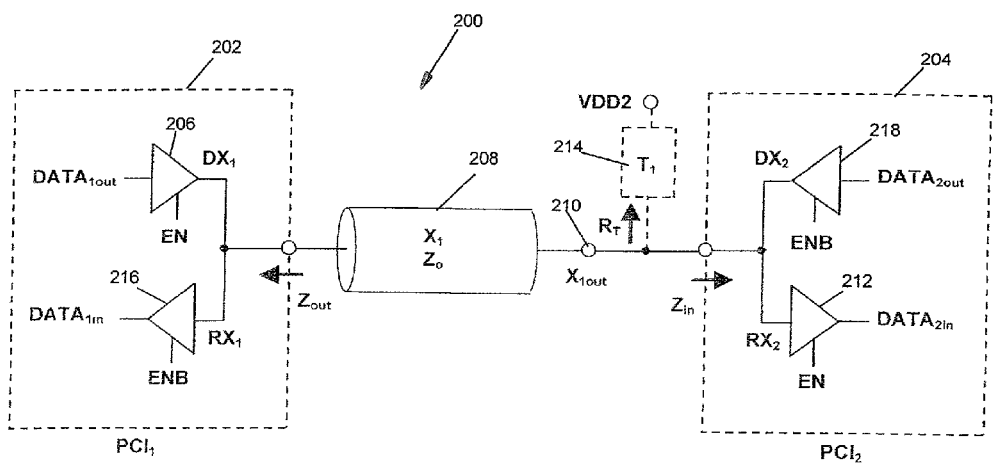
FIG. 2 is a block diagram illustrating a PCI-X DDR system with pull-up type termination in accordance with an exemplary embodiment of the present invention.

FIG. 2 illustrates a PCI-X DDR system 200 in accordance with an exemplary embodiment of the present invention. Like the PCI-X system 100 shown in FIG. 1, data transfer is again from the $PCI_1$ block 202 to the $PCI_2$ block 204. The driver $DX_1$ 206 is enabled to drive the transmission line $X_1$ 208 such as a PC board trace. The transmission line $X_1$ 208 far end terminal $X_{1out}$ 210 is connected to the input of the enabled receiver $RX_2$ 212 and to the terminal $T_1$ 214. The receiver $RX_1$ 216 and the driver $DX_2$ 218 are both disabled during this data transmission.

In exemplary embodiments of the present invention, correct impedance matching is obtained among the driver, transmission line and receiver input. The output impedance $Z_{OUT}$ of driver $DX_1$ 206 is matched to the transmission line characteristic impedance $Z_o$. The far end transmission line becomes properly terminated by making the terminator $T_1$ resistance $R_T=Z_o$. Thus, the receiver $RX_2$ high input impedance $Z_{IN}$ becomes inconsequential, resulting in an impedance match for the entire PCI-X DDR system 200. As a result, signal reflections are substantially minimized and signal integrity is substantially improved, increasing the reliability of data transmission.

Figure 3:
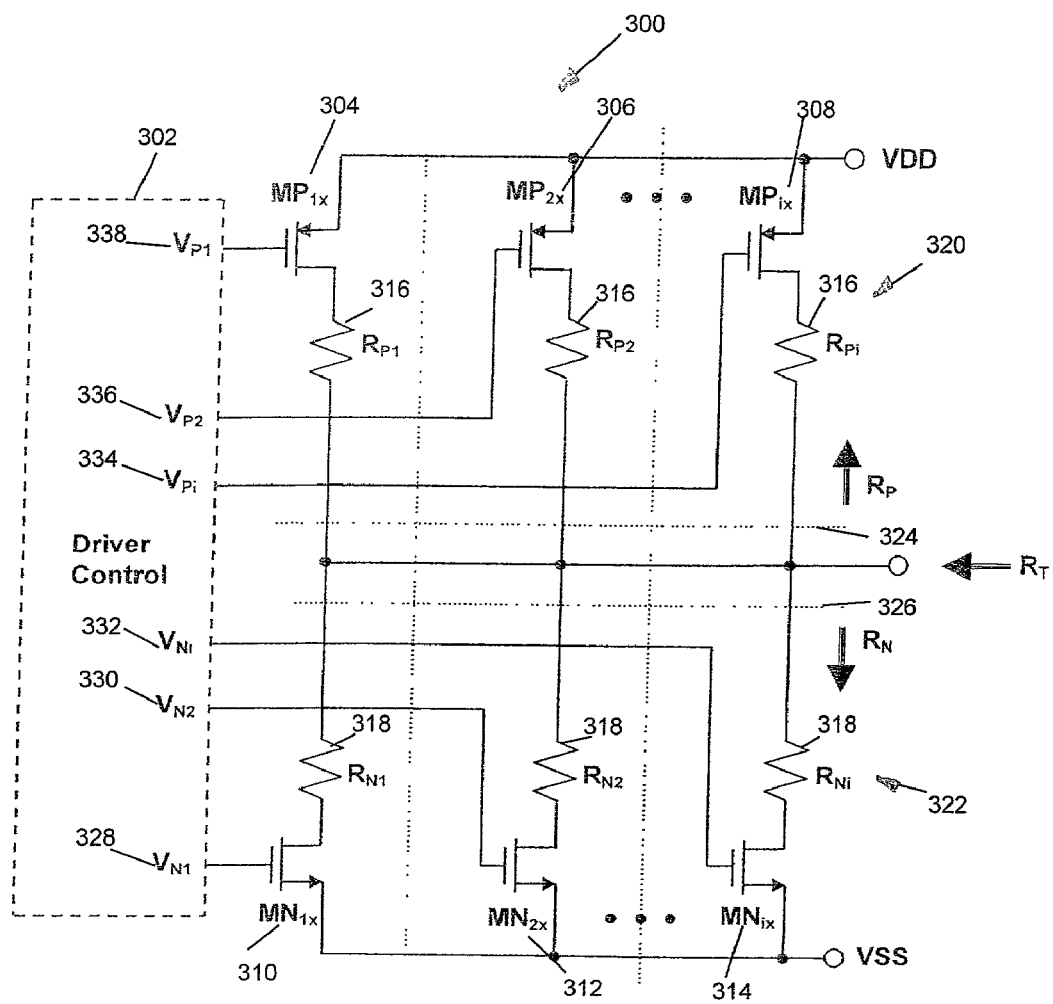
FIG. 3 is a circuit diagram illustrating a configurable PCI-X DDR Driver providing an internal terminator in accordance with an exemplary embodiment of the present invention.

Referring now to FIG. 3, a simplified PCI-X DDR driver/terminator 300 in accordance with an exemplary embodiment of the present invention is described. The PCI-X DDR driver 300 (which corresponds, for example, to driver $DX_2$ 218 shown in FIG. 2) includes a driver control 302. Preferably, the driver control 302 includes the impedance controller to correct for process/voltage/temperature (PVT) effects. In FIG. 3, the devices $MP_{1x}, MP_{2x}, \ldots MP_{ix}$ 304–308 and $MN_{1x}, MN_{2x}, \ldots MN_{ix}$ 310–314 represent groups of devices even though only one device is shown for simplicity. In exemplary embodiments, the sizes of these devices are weighted to achieve the desired output impedance in conjunction with discrete resistors $R_{Pi}$ 316 or $R_{Ni}$ 318 for the given PVT conditions.

As shown in FIG. 3, the PCI-X DDR driver 300 is subdivided into groups of P and N channel devices 320 & 322 along dashed lines 324 & 326. Each group 320 & 322 is individually controlled by driver control 302 to be either on or off. This approach permits selection of any of the device groups 320 or 322 independently allowing the driver 300 to be configured to provide three different termination types: pull-up type, pull-down type, and symmetric type. For a pull-up type termination, the terminator impedance ($R_T=Z_o$) from transmission line end $X_{1out}$ 210 (FIG. 2) is connected to the power supply VDD. The power supply VDD acts as an AC ground. For a pull-down type termination, the terminator impedance ($R_T=Z_o$) from transmission line end $X_{1out}$ 210 (FIG. 2) is connected to the system ground VSS. Finally, for a symmetric type termination, the terminator impedance ($R_T=Z_o$) from transmission line end $X_{1out}$ 210 (FIG. 2) is connected to both VDD ($R_P$) and VSS ($R_N$). In this case the equivalent load impedance is equal to the parallel combination of these two resistors, i.e. $R_T=R_P\|R_N$.

The implementation of a pull-up type PCI-X DDR terminator for a specific impedance value is now described for illustration. All groups of N channel devices are tri-stated by setting the $V_{N1}, V_{N2}, \ldots V_{Ni}$ control terminals 328–332 low via driver control 302. To select the particular value of terminal impedance $R_T$, selected $V_{P1}, V_{P2}, \ldots V_{Pi}$ control terminals 334–338 are also set low by the driver control 302. For example, to obtain a value of $R_T=50\Omega$, the $V_{P1}, V_{P5}, \ldots V_{P7}$ control terminals may be set low, enabling only selected groups of corresponding $MP_{1x}, MP_{5x}$, and $MP_{7x}$ devices.

For implementation of a pull-down type of termination, the groups of N-channel devices are enabled by setting the $V_{N1}, V_{N2}, \ldots V_{Ni}$ control terminals 328–332 high via the driver control 302. All P-channel devices are disabled for the pull-down type of terminator.

For implementation of a symmetric type of termination, selected groups of both P and N-channel devices are enabled to meet the overall termination impedance $R_T=R_P\|R_N$ as depicted in FIG. 3.

The PCI-X DDR driver 300 may utilize existing driver devices without the additional chip area penalty, and may be programmable for correct terminator impedance value $R_T=Z_o$ and maintains the process/voltage/temperature characteristics of the termination impedance. Preferably, the driver 300 does not increase the parasitic capacitance of the pad by using the same devices of the driver. The driver/terminator may further have applications in other transmission methodologies such as AGP4X, AGP8X, and the like.

It is believed that the dual purpose PCI-X DDR configurable terminator/driver of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A PCI-X DDR driver for providing internal termination to a transmission line, comprising:
    a driver control;
    a plurality of N-channel devices each coupled in series with a discrete resister for providing a desired output impedance, the plurality of N-channel devices being divided into at least two groups; and
    a plurality of P-channel devices each coupled in series with a discrete resister for providing a desired output impedance, the plurality of P-channel devices being divided into at least two groups,
    wherein the driver control is suitable for individually controlling selected ones of the groups of N-channel and P-channel devices on or off for providing internal termination to the transmission line, the driver control controlling selected ones of the groups of N-channel and P-channel devices on or off for providing one of pull-up type termination, pull-down type termination, and symmetric type termination to the transmission line.

2. The PCI-X DDR driver as claimed in claim 1, wherein the driver control enables selected ones of the groups of P-channel devices for providing pull-up termination.

3. The PCI-X DDR driver as claimed in claim 2, wherein the transmission line includes a transmission line end having a terminator impedance, and wherein the terminator impedance is connected to a power supply VDD.

4. The PCI-X DDR driver as claimed in claim 1, wherein the driver control enables selected ones of the groups of N-channel devices for providing pull-down termination.

5. The PCI-X DDR driver as claimed in claim 4, wherein the transmission line includes a transmission line end having a terminator impedance and wherein the terminator impedance is connected to a system ground VSS.

6. The PCI-X DDR driver as claimed in claim 1, wherein the driver control enables selected ones of the groups of both P-channel and N-channel devices for providing symmetric termination.

7. The PCI-X DDR driver as claimed in claim 6, wherein the transmission line includes a transmission line end having a terminator impedance and wherein the terminator impedance is connected to both a power supply VDD and a system ground VSS.

8. The PCI-X DDR driver as claimed in claim 1, wherein the driver control includes an impedance controller for correcting process/voltage/temperature effects.

9. The PCI-X DDR driver as claimed in claim 1, wherein a size of at least one of the groups of N-channel and P-channel devices has its size weighted to provide an output impedance for given process/voltage/temperate conditions.

10. The PCI-X DDR driver as claimed in claim 9, wherein the size of at least one of the groups of N-channel and P-channel devices has its size weighted in conjunction with a discrete resistor.

11. A PCI-X DDR system, comprising:
a transmission line; and
a driver for providing internal termination to the transmission line, the driver including:
a driver control;
a plurality of N-channel devices each coupled in series with a discrete resister for providing a desired output impedance, the plurality of N-channel devices being divided into at least two groups; and
a plurality of P-channel devices each coupled in series with a discrete resister for providing a desired output impedance, the plurality of P-channel devices being divided into at least two groups,
wherein the driver control is suitable for individually controlling selected ones of the groups of N-channel and P-channel devices on or off for providing internal termination to the transmission line, the driver control controlling selected ones of the groups of N-channel and P-channel devices on or off for providing one of pull-up type termination, pull-down type termination, and symmetric type termination to the transmission line.

12. The PCI-X DDR system as claimed in claim 11, wherein the driver control enables selected ones of the groups of P-channel devices for providing pull-up termination.

13. The PCI-X DDR system as claimed in claim 12, wherein the transmission line includes a transmission line end having a terminator impedance, and wherein the terminator impedance is connected to a power supply VDD.

14. The PCI-X DDR system as claimed in claim 11, wherein the driver control enables selected ones of the groups of N-channel devices for providing pull-down termination.

15. The PCI-X DDR system as claimed in claim 14, wherein the transmission line includes a transmission line end having a terminator impedance and wherein the terminator impedance is connected to a system ground VSS.

16. The PCI-X DDR system as claimed in claim 11, wherein the driver control enables selected ones of the groups of both P-channel and N-channel devices for providing symmetric termination.

17. The PCI-X DDR system as claimed in claim 16, wherein the transmission line includes a transmission line end having a terminator impedance and wherein the terminator impedance is connected to both a power supply VDD and a system ground VSS.

18. The PCI-X DDR system as claimed in claim 11, wherein the driver control includes an impedance controller for correcting process/voltage/temperature effects.

19. The PCI-X DDR system as claimed in claim 11, wherein a size of at least one of the groups of N-channel and P-channel devices has its size weighted to provide an output impedance for given process/voltage/temperate conditions.

20. The PCI-X DDR system as claimed in claim 19, wherein the size of at least one of the groups of N-channel and P-channel devices has its size weighted in conjunction with a discrete resistor.

21. A PCI-X DDR driver for providing internal termination to a transmission line, comprising:
a plurality of N-channel devices each coupled in series with a discrete resister for providing a desired output impedance, the plurality of N-channel devices being divided into at least two groups;
a plurality of P-channel devices each coupled in series with a discrete resister for providing a desired output impedance, the plurality of P-channel devices being divided into at least two groups;
means for individually controlling the groups of N-channel and P-channel devices;
wherein the controlling means is suitable for individually controlling selected ones of the groups of N-channel and P-channel devices on or off for providing internal termination to the transmission line, the controlling means controlling selected ones of the groups of N-channel and P-channel devices on or off for providing one of pull-up type termination, pull-down type termination, and symmetric type termination to the transmission line.

* * * * *